Nov. 14, 1967  W. JAFFE'  3,353,044
LOW-VOLTAGE WINDINGS ON A.C. SERIES MOTORS FOR
INCANDESCENT LAMP VOLTAGE SUPPLY
Filed Aug. 30, 1965

WITNESS
Nicholas Leszczak

INVENTOR.
Wolfgang Jaffe'
BY
Marshall J. Breen
ATTORNEY

United States Patent Office 3,353,044
Patented Nov. 14, 1967

3,353,044
LOW-VOLTAGE WINDINGS ON A.C. SERIES MOTORS FOR INCANDESCENT LAMP VOLTAGE SUPPLY
Wolfgang Jaffé, Mountain Lakes, N.J., assignor to The Singer Company, New York, N.Y., a corporation of New Jersey
Filed Aug. 30, 1965, Ser. No. 483,667
4 Claims. (Cl. 310—73)

This invention relates to windings on the stator cores of A.C. series motors for obtaining low voltage for supplying current to incandescent lamps for illumination and more particularly to a specific location for a winding relative to the field core and field winding of the motor, which location results in minimum change in the effective or R.M.S. voltage to the lamp due to change in load and speed of the motor.

It is known to supply a low voltage for illuminating lamps from a tapped portion of the field winding of series A.C. motors or from a separate winding on the field poles thereof and mutually coupled to the field winding and sharing the same flux linkage. The low voltage is desirable so that a short, rugger filament can be used for long incandescent lamp life and the use of the motor field as a flux source saves space, weight and cost. However, this approach has not found universal acceptance because the R.M.S. voltage output from such a system varies widely in response to the load and speed of the motor; said voltage being dependent, as it is, on the field voltage itself. This results in visibly adverse variations in the filament temperature of the incandescent lamps and in the intensity of illumination produced thereby with changing loads. Under stall conditions of the motor, there results extreme over-voltage on the lamp which greatly decreases the life of the lamp.

It has been found, according to the present invention, that a separate winding wound on the yoke section of the field core connecting the two pole sections will provide an R.M.S. voltage output considerably less sensitive to variations in the motor load and is thus more suitable for supplying an incandescent lamp than the conventional winding wound directly on the field pole.

It is therefore an object of this invention to provide a low-voltage winding on the stator core of a series A.C. motor, which winding shall provide an R.M.S. voltage of sufficiently constant value with respect to changing loads on the motor to be useful in supplying current to incandescent illuminating lamps.

The above and other objects of this invention will become apparent as the following detailed description is considered in connection with the associated drawings.

In the drawings, FIG. 1 is a transverse sectional view taken through a typical series A.C. motor showing a prior art arrangement of a winding for supplying a lamp;

Figure 1:
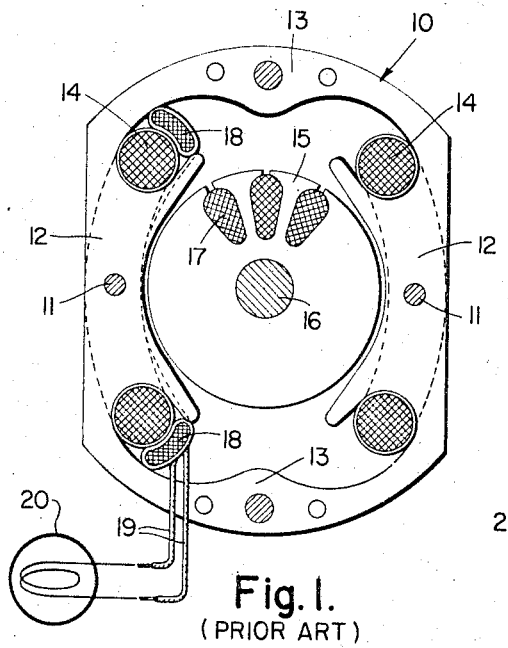

Referring to FIG. 1 a stator field core 10 comprising stacked magnetic laminations held together by rivets 11, is formed with pole sections 12 and connecting yoke sections 13. Field windings 14 surround each pole section 12 or at least one of them to provide the working flux for the motor. A slotted armature core 15 is mounted on a shaft 16 and carries a winding 17. The armature 15 rotates in the air gap between the poles 12 as is well known in the art. A separate winding 18 is wound on one of the poles 12 as shown over the field winding 14 from which it is insulated. This winding 18 serves as a secondary low-voltage winding to the field winding 14, as primary, and a voltage will be induced in winding 18 by virtue of the mutual flux which threads through both windings 14 and 18 in the pole section 12. Leads 19 connect winding 18 to an illuminating lamp 20. All of the above structure is known in the prior art and represents its present state.

It will be seen that, in the prior art arrangement of FIG. 1, the winding 18 is closely coupled to and shares flux mutually with the field winding 14. Voltage changes in winding 14 will therefore, be directly induced in winding 18. Thus, as the load or torque demand on the motor increases, its armature slows down and the back E.M.F. of the armature winding 17 decreases. This puts more of the line voltage across the field windings 14, which are in series with the armature winding 17, and the winding 18, acting as a close coupled secondary, will supply to lamp 20 an adversely increasing R.M.S. voltage responsively to load increase.

Thus, for varying loads, the illumination intensity supplied by the lamp 20 will also be varying from a minimum at no load to a maximum at full load. This condition is not only annoying to the human eye and produces fatigue but, since the lamp is subjected to overvoltage at full loads, it severely limits the lamp life.

Figure 2:
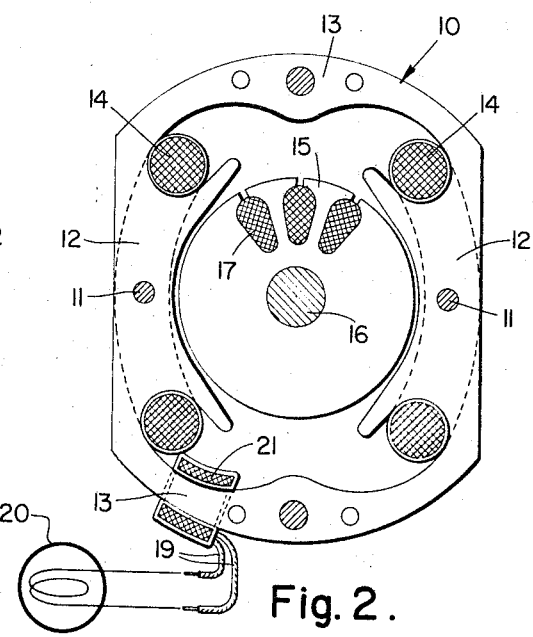
FIG. 2 is a transverse sectional view similar to that of FIG. 1 but showing a winding arrangement illustrating an embodiment of this invention.

To remove or greatly alleviate the above-mentioned difficulties, the arrangement illustrated in FIG. 2 according to this invention may be utilized. In this case a winding 21 surrounds the narrow yoke section 13 and supplies the voltage to the lamp 20 through leads 19. It is found that the R.M.S. value of the voltage supplied by winding 21 is much less sensitive to changes in motor load than was the case with the winding 18 of FIG. 1. Thus, the illumination supplied by lamp 20 will be more uniform and independent of load changes. Further, extremely high R.M.S. voltages will be avoided by the use of winding 21 and lamp life accordingly prolonged.

The reason for this improved performance is thought to be due to the fact that the yoke section 13 on which the winding 21 is located is paralleled by an essentially equivalent yoke section diametrically opposite to it. Since any current flow in coil 21 caused by the voltage included in coil 21 would tend to oppose the change in flux linking the coil, the flux variation in coil 21 would be less than the variation in either the field poles or in the yoke section diametrically opposite. Since the voltage induced in winding 21 is proportional to the time rate of change of flux through it, this voltage will have a peaked wave form of nearly constant area and the R.M.S. value will thus remain substantially constant for large changes in the voltage on winding 14.

Figure 3:
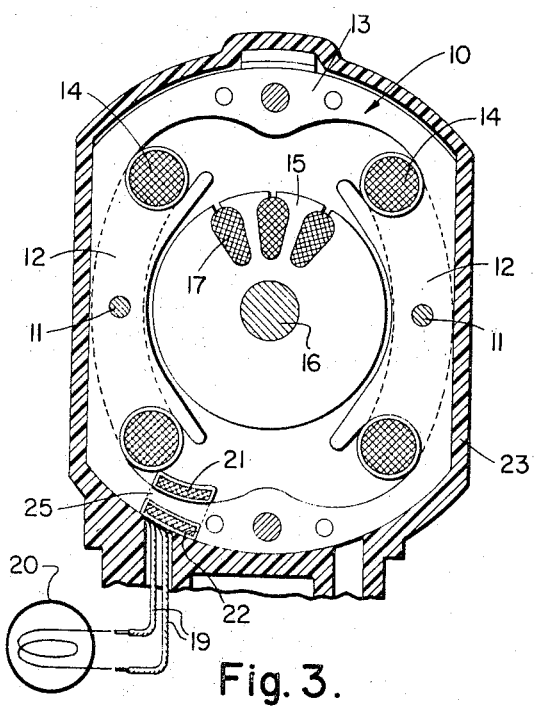
FIG. 3 is a transverse sectional view taken through a motor and illustrating a further embodiment of this invention.
Figure 4:
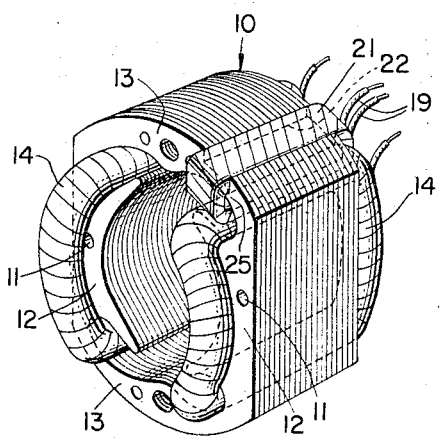
FIG. 4 is a perspective view of the field core of the motor of FIG. 3.

The above reasoning suggests a modification as shown in FIG. 3 where the cross-sectional area of the yoke 13 is further reduced at 25 by the deliberate formation of a slot 22 which also provides a recessed space for the winding 21 and avoids interference with a conventional insulated housing 23 for the motor by providing a winding 21 which is flush with the outside surface of the field core 10, as shown more clearly in FIG. 4.

While the slotted modification of FIGS. 3 and 4 is desirable from the standpoint of more constant illumination by lamp 20, it cannot, of course, be carried to the point where the increased reluctance of the single yoke path 25 causes an unbalance in the air gap flux sufficient to adversely affect the motor performance.

Thus, it will be apparent from the above that there is provided, according to this invention, a series A.C. commutator motor having a low-voltage winding wound on the field core, insulated from the field winding and specially related thereto so that the R.M.S. voltage induced in said low-voltage winding by the field flux is substantially unaffected by the inherent variations in the field flux due to the speed changes in the armature as a function of load, said low-voltage winding thus being suitable for supplying current to an incandescent illuminating lamp.

Having thus described the nature of the invention, what I claim herein is:

1. A series A.C. commutator motor comprising a magnetic field core formed with pole sections connected by yoke sections, a field winding wound directly on at least one of said pole sections for supplying flux to said core, and an auxiliary winding insulated from said field winding and wound on one of said yoke sections.

2. A series A.C. commutator motor comprising a magnetic field core formed with pole sections connected by yoke sections to form a closed path for magnetic flux flow, a field winding wound directly on at least one of said pole sections for supplying field flux to said core, said yoke sections being of reduced cross-sectional area relative to said pole sections, and an auxiliary winding wound on one of said yoke sections for supplying a voltage having an R.M.S. value substantially unaffected by changes in the speed of said motor.

3. A series A.C. commutator motor comprising a magnetic field core formed with pole sections connected by yoke sections to form a closed path for magnetic flux, a field winding wound directly on at least one of said pole sections for supplying field flux to said core, at least one of said yoke sections being slotted in a portion thereof to significantly reduce the cross-sectional area of said portion relative to the cross-sectional area of said pole section and to form a recess for receiving a winding therein, and a winding received in said recess and wound on said slotted portion for supplying a voltage having an R.M.S. value substantially unaffected by changes in the speed of said motor.

4. A series A.C. commutator motor comprising a magnetic core having pole sections connected by yoke sections to form a closed path for alternating flux, a field winding wound on at least one of said pole sections for supplying said flux, said yoke sections having significantly smaller cross-sectional areas than said pole sections, and an auxiliary winding insulated from said field winding and wound on at least one of said yoke sections for providing a voltage source dependent only on the time rate of change of flux in said yoke portion.

References Cited
UNITED STATES PATENTS

| | | | |
|---|---|---|---|
| 1,851,688 | 3/1932 | Warren | 310—73 |
| 2,288,183 | 6/1942 | Dalkowitz | 310—73 |

MILTON O. HIRSHFIELD, *Primary Examiner.*

L. L. SMITH, *Assistant Examiner.*